(12) United States Patent
Habuta et al.

(10) Patent No.: US 7,169,455 B2
(45) Date of Patent: Jan. 30, 2007

(54) OPTICAL INFORMATION RECORDING MEDIUM AND METHOD FOR MANUFACTURING THE SAME

(75) Inventors: Haruhiko Habuta, Osaka (JP); Noboru Yamada, Hirakata (JP); Ken'ichi Nagata, Nishinomiya (JP); Takashi Nishihara, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 118 days.

(21) Appl. No.: 10/947,192

(22) Filed: Sep. 23, 2004

(65) Prior Publication Data

US 2005/0079390 A1    Apr. 14, 2005

(30) Foreign Application Priority Data

Oct. 10, 2003 (JP) ............................. 2003-351824
Feb. 23, 2004 (JP) ............................. 2004-045876

(51) Int. Cl.
*B32B 3/02* (2006.01)

(52) U.S. Cl. ................ 428/64.4; 428/64.5; 430/270.13

(58) Field of Classification Search ............... 428/64.5, 428/64.6, 64.4; 430/270.13
See application file for complete search history.

(56) References Cited

U.S. PATENT DOCUMENTS

| | | | |
|---|---|---|---|
| 5,882,759 A * | 3/1999 | Hirotsune et al. ......... | 428/64.1 |
| 6,177,166 B1 * | 1/2001 | Ohno et al. ................ | 428/64.1 |
| 6,195,326 B1 * | 2/2001 | Yoshinari et al. ......... | 369/275.4 |
| 6,312,780 B1 * | 11/2001 | Kasami et al. ............. | 428/64.1 |
| 6,355,326 B1 | 3/2002 | Lee et al. | |
| 6,383,595 B1 * | 5/2002 | Hirotsune et al. ......... | 428/64.1 |
| 6,899,993 B2 * | 5/2005 | Jeong et al. ........... | 430/270.13 |
| 2002/0015914 A1 | 2/2002 | Miyamoto et al. | |

FOREIGN PATENT DOCUMENTS

| | | |
|---|---|---|
| EP | 0 917 137 | 5/1999 |
| EP | 1 302 940 | 4/2003 |
| JP | 11-238253 | 8/1999 |
| JP | 2002-237098 | 8/2002 |
| JP | 2003-338083 | 11/2003 |

* cited by examiner

*Primary Examiner*—Bruce H. Hess
(74) *Attorney, Agent, or Firm*—Wenderoth, Lind & Ponack, L.L.P.

(57) ABSTRACT

An optical information recording medium on which information can be recorded and reproduced by using a laser beam is provided. The medium includes a substrate with a guide groove and a multilayered metal film including at least a first metal layer, a barrier layer and a second metal layer that are deposited on the substrate in this order, or a single layer metal film including at least a metal layer and a recording layer are deposited on the substrate in this order. The second metal layer and the metal layer of the single layer metal film are a material containing Al and a metal element (an additive) as main components.

26 Claims, 4 Drawing Sheets

OPTICAL INFORMATION RECORDING MEDIUM AND METHOD FOR MANUFACTURING THE SAME

BACKGROUND OF THE INVENTION

1. Field of the Invention

The present invention relates to an optical information recording medium on which information can be recorded, reproduced, erased and rewritten at high density and high speed by an optical method which includes irradiation with a laser beam. The present invention also relates to a method for manufacturing such a medium.

2. Description of the Prior Art

A phase change optical information recording medium utilizes a recording layer that causes a reversible phase change between a crystalline phase and an amorphous phase for recording, erasing and rewriting information. When this recording layer is irradiated by a laser beam of high power and is cooled rapidly, the irradiated portion becomes amorphous. In addition, when an amorphous portion of the recording layer is irradiated by a laser beam of low power and is cooled slowly, the irradiated portion becomes crystalline. Therefore, a phase change optical information recording medium can freely change the recording layer between an amorphous phase and crystalline phase when the recording layer is irradiated by a laser beam having a power that is modulated between a high power level and low power level. This optical information recording medium utilizes the difference of a reflection factor between the amorphous phase and the crystalline phase for recording information.

In order to increase the quantity of information that can be stored on the optical information recording medium, there is a basic method in which the density of a recording surface on the optical information recording medium is enhanced by shortening the wavelength of the laser beam or by enlarging the numerical aperture NA of an objective lens for condensing the laser beam so as to reduce the diameter of the laser spot. Recently, a blue laser having a wavelength of approximately 400 nm is beginning to have practical use. It has been proposed to reduce the diameter of the laser spot and improve the density of the recording surface by using a blue laser for the optical system for recording and reproducing of an optical information recording medium and by setting the numerical aperture NA of the objective lens of the optical system to a large value (approximately 0.60–0.85, like a DVD-RAM, for example). As a result of increasing the recording density, i.e. reducing the recording area per bit, the surface roughness of the film has had a large influence on disk characteristics.

A multilayered film as shown in FIG. 1, for example, is a typical structure of the phase change optical information recording medium (note that although FIG. 1 shows an embodiment of the present invention, it is referred to here for understanding the prior art). Namely, the optical information recording medium includes a substrate 1 of a resin such as polycarbonate or polymethyl methacrylate (PMMA) or a glass, on which a multilayered metal film 5, an upper dielectric layer 6, an upper interface layer 7, a recording layer 8, a lower interface layer 9 and a lower dielectric layer 10 are formed sequentially by sputtering, vapor deposition or the like.

ZnS—SiO$_2$ is typically used as the material of the upper dielectric layer 6 and the lower dielectric layer 10. These dielectric layers have the functions of adjusting a reflection factor, an absorption ratio or the like of the disk by an interference effect of light, and protecting against evaporation of the recording layer or thermal damage to the substrate.

The upper interface layer 7 and the lower interface layer 9 have the functions of improving an erasing characteristic by promoting crystallization of the recording layer 8 and improving the repeating durability by preventing mutual diffusion of atoms between the recording layer 8 and the upper dielectric layer 6 as well as between the recording layer 8 and the lower dielectric layer 10.

The multilayered metal film 5 is a material having a high thermal conductivity, which improves efficiency in using light by reflecting the laser beam and works as a heat diffusion layer for rapidly dissipating heat generated in the recording layer 8. The multilayered metal film 5 is a single metal material such as Al or Ag having a high thermal conductivity, or a material containing one or more elements among them and one or more additive elements for improving humidity resistance or adjusting thermal conductivity or adjusting an optical reflection factor, an optical absorption ratio or an optical transmittance. More specifically, an alloy material such as Al—Cr, Al—Ti, Ag—Pd, Ag—Pd—Cu or Ag—Pd—Ti is used. In this way, the multilayered metal film 5 is a material that has the largest crystallinity among the layers, and so the surface roughness of the film mentioned above depends on the surface roughness of the multilayered metal film 5.

If a material containing Ag as a main component is used for the multilayered metal film 5, it has the advantage of a better cooling ability due to its higher thermal conductivity than a material containing Al as a main component. However, ZnS—SiO$_2$ is typically used for the upper dielectric layer 6 as described above. Therefore, there is the problem of corrosion that may arise due to a reaction between Ag and S when the material of the multilayered metal film 5 containing Ag as a main component contacts the ZnS—SiO$_2$ of the upper dielectric layer 6. That is, the material containing Ag as a main component has the problem of low resistance to corrosion.

In order to solve these problems of corrosion resistance and surface roughness of the film, a new structure has been proposed in which a barrier layer is disposed between the upper dielectric layer 6 and the metal layer 2 (see Japanese unexamined patent publication No. 2003-338083, for example). In addition, another structure has been proposed in which a metal film of Ag (30 nm), a high thermal conductivity film of Be (5 nm) and a metal film of Al (30 nm) are deposited in this order as the multilayered metal film 5 (see Japanese unexamined patent publication No. 2002-237098, pp 5–7 and FIG. 3). Here, the high thermal conductivity film of Be and the metal film of Al are inserted as the barrier layer for anti-corrosion, between the metal film of Ag and the upper dielectric layer of ZnS—SiO$_2$. Therefore, the metal film of Ag cannot contact the ZnS—SiO$_2$ layer, and so corrosion can be prevented. In addition, the metal material having a smaller crystal grain size than the material containing Al as a main component is formed before forming the metal film of Al in this structure, so the crystal grain size of Al can become smaller.

As a method for further reducing the crystal grain size of Al, a second element may be added. The added second element prevents the crystal grains of Al from growing, so they are smaller. However, if the second element is added to the conventional metal film of Al, the thermal conductivity is lowered, although the surface roughness is usually improved. Thus, the improvement in surface roughness is not compatible with the high cooling ability.

SUMMARY OF THE INVENTION

An object of the present invention is to provide an optical information recording medium having a multilayered metal film or a single layer metal film in which the surface roughness is improved and high cooling ability is obtained.

In a first aspect of the present invention, an optical information recording medium that can record and reproduce information by using a laser beam and a method for manufacturing the same are disclosed. The optical information recording medium includes a substrate with a guide groove, on which at least a first metal layer, a barrier layer, a second metal layer and a recording layer are formed in this order. The second metal layer is primarily composed of a material whose main components are Al and a metal element (an additive).

An Al alloy has a crystal grain diameter and a thermal conductivity that vary in accordance with element type and quantity of additive. If the quantity of additive is too large, the thermal conductivity is lowered and a C/N ratio deteriorates. On the contrary, if the quantity of additive is too small, noise increases so that the C/N ratio deteriorates, too. According to the above consideration, the metal element to be added to Al is preferably at least one element selected from the group consisting of Cu, Ag, Au, B, Bi, Cd, Ga, Ge, Pb, Sn and Zn within the range of 0.1–15.0 atom %, Ni, Si and Pt within the range of 0.1–10.0 atom %, and Ta, Cr and Ti within the range of 0.1–7.5 atom %. It is more preferable that the metal element to be added is at least one element selected from the group consisting of Cu, Ag, Au, B, Bi, Cd, Ga, Ge, Pb, Sn and Zn within the range of 0.1–10.0 atom %, Ni, Si and Pt within the range of 0.1–7.5 atom %, and Ta, Cr and Ti within the range of 0.1–5.0 atom %.

It is preferable that the film thickness of the second metal layer be within the range of 10–100 nm. If the film thickness of the second metal layer is smaller than 10 nm, the thermal conductivity is decreased and the C/N ratio is lowered. On the contrary, if it is larger than 100 nm, the crystal grain diameter becomes large so that noise increases due to the surface roughness of the metal layer. The increase of noise causes deterioration of the C/N ratio and severely affects the disk characteristics. It is still more preferable that the film thickness is within the range of 10–30 nm.

It is preferable that the barrier layer be a material containing at least one element selected from the group consisting of C, Si, Cr, Ni, Mo, W and Ta as a main component. It is also preferable that the barrier layer be a material containing a main component which is an oxide or nitride of at least one element selected from the group consisting of Al, Ti, Zr, Hf, Ta, Cr and Si.

It is preferable that the film thickness of the barrier layer is within the range of 1–20 nm. If the film thickness is not within this range, the C/N ratio is lowered due to low cooling ability so that disk characteristics are severely affected.

The first metal layer is preferably a material containing Ag as a main component. When the second metal layer is a material containing Al as a main component, it has a thermal conductivity smaller than a material containing Ag as a main component. However, the cooling ability of the multilayered metal film can be improved by inserting a first metal layer of a material containing Ag as a main component that has a high thermal conductivity between the substrate and the second metal layer. In addition, the Ag of the first metal layer diffuses into the second metal layer of Al, even at room temperature, and so a reflection factor of the second metal layer may decrease. However, the decrease in reflection factor can be prevented by inserting the barrier layer between them.

It is preferable that the film thickness of the first metal layer is within the range of 20–300 nm. If the film thickness of the first metal layer is smaller than 20 nm, the C/N ratio is reduced due to a decrease in thermal conductivity. On the contrary, if it is larger than 300 nm, productivity is reduced.

Furthermore, the optical information recording medium according to the present invention preferably includes an upper dielectric layer between the second metal layer and the recording layer, and a lower dielectric layer on the far side of the recording layer from the upper dielectric layer.

The upper dielectric layer is preferably a material containing S. For example, the upper dielectric layer may be a material of ZnS. In particular, $ZnS—SiO_2$ is an amorphous material having a large refractive index, a high film-forming speed, good mechanical characteristics and good humidity resistance.

It is preferable that a main component of the first metal layer is Ag, a main component of the barrier layer is Ni, a main component of the second metal layer is Al, a main component of the upper dielectric layer is ZnS or an oxide, main components of the recording layer are Ge, Sb and Te, and a main component of the lower dielectric layer is ZnS or an oxide.

In addition, it is preferable that the film thickness of the first metal layer is within the range of 20–200 nm, the film thickness of the barrier layer is within the range of 1–20 nm, the film thickness of the second metal layer is within the range of 10–100 nm, the film thickness of the upper dielectric layer is within the range of 15–40 nm, the film thickness of the recording layer is within the range of 5–15 nm, and the film thickness of the lower dielectric layer is within the range of 30–100 nm.

In a second aspect of the present invention, an optical information recording medium that can record and reproduce information by using a laser beam and a method for manufacturing the same are disclosed. The optical information recording medium includes a substrate with a guide groove, on which at least a metal layer and a recording layer are formed in this order. The metal layer is a material containing main components that are Al and a metal element (an additive).

As described above, if the quantity of additive material is too large, thermal conductivity is lowered so that the C/N ratio deteriorates. On the contrary, if the quantity is too small, noise increases so that the C/N ratio deteriorates. As a result of this consideration, the metal element to be added to Al is preferably at least one element selected from the group consisting of Cu, Ag, Au, B, Bi, Cd, Ga, Ge, Pb, Sn and Zn within the range of 1.0–15.0 atom %, and Si and Pt within the range of 1.0–10.0 atom %. In particular, it is preferably at least one element selected from the group consisting of Cu, Ag, Au, B, Bi, Cd, Ga, Ge, Pb, Sn, and Zn within the range of 1.0–10.0 atom %, and Si and Pt within the range of 1.0–5.0 atom %.

It is preferable that the film thickness of the metal layer is within the range of 20–300 nm. If the film thickness is too small, the thermal conductivity is lowered so that the C/N ratio deteriorates. On the contrary, if it is too large, productivity is reduced.

Furthermore, the optical information recording medium according to the present invention has a structure further including an upper dielectric layer disposed between the metal layer and the recording layer, and a lower dielectric layer disposed on the far side of the recording layer from the upper dielectric layer.

It is preferable that the upper dielectric layer is a material containing S. For example, the upper dielectric layer may be ZnS. In particular, ZnS—$SiO_2$ is an amorphous material having a large refractive index, a high film-forming speed, good mechanical characteristics and good humidity resistance.

It is preferable that a main component of the upper dielectric layer is ZnS or an oxide, main components of the recording layer are Ge, Sb and Te, or Ge, Bi and Te, and a main component of the lower dielectric layer is ZnS or an oxide.

In addition, it is preferable that the film thickness of the metal layer is within the range of 20–300 nm, the film thickness of the upper dielectric layer is within the range of 15–40 nm, the film thickness of the recording layer is within the range of 5–15 nm, and the film thickness of the lower dielectric layer is within the range of 30–100 nm.

An optical information recording medium that can record and reproduce information by using a laser beam and a method of manufacturing are described above. The optical information recording medium includes a multilayered metal film including at least a first metal layer, a barrier layer and a second metal layer formed in this order, or a single layer metal film including at least a metal layer and a recording layer in this order, on a substrate with a guide groove. The second metal layer or the metal layer of the single layer metal film is a material whose main components are Al and a metal element (an additive). Thus, the surface roughness of the multilayered metal film or the single layer metal film can be improved, and high cooling ability can be obtained.

DESCRIPTION OF THE PREFERRED EMBODIMENTS

Figure 1:
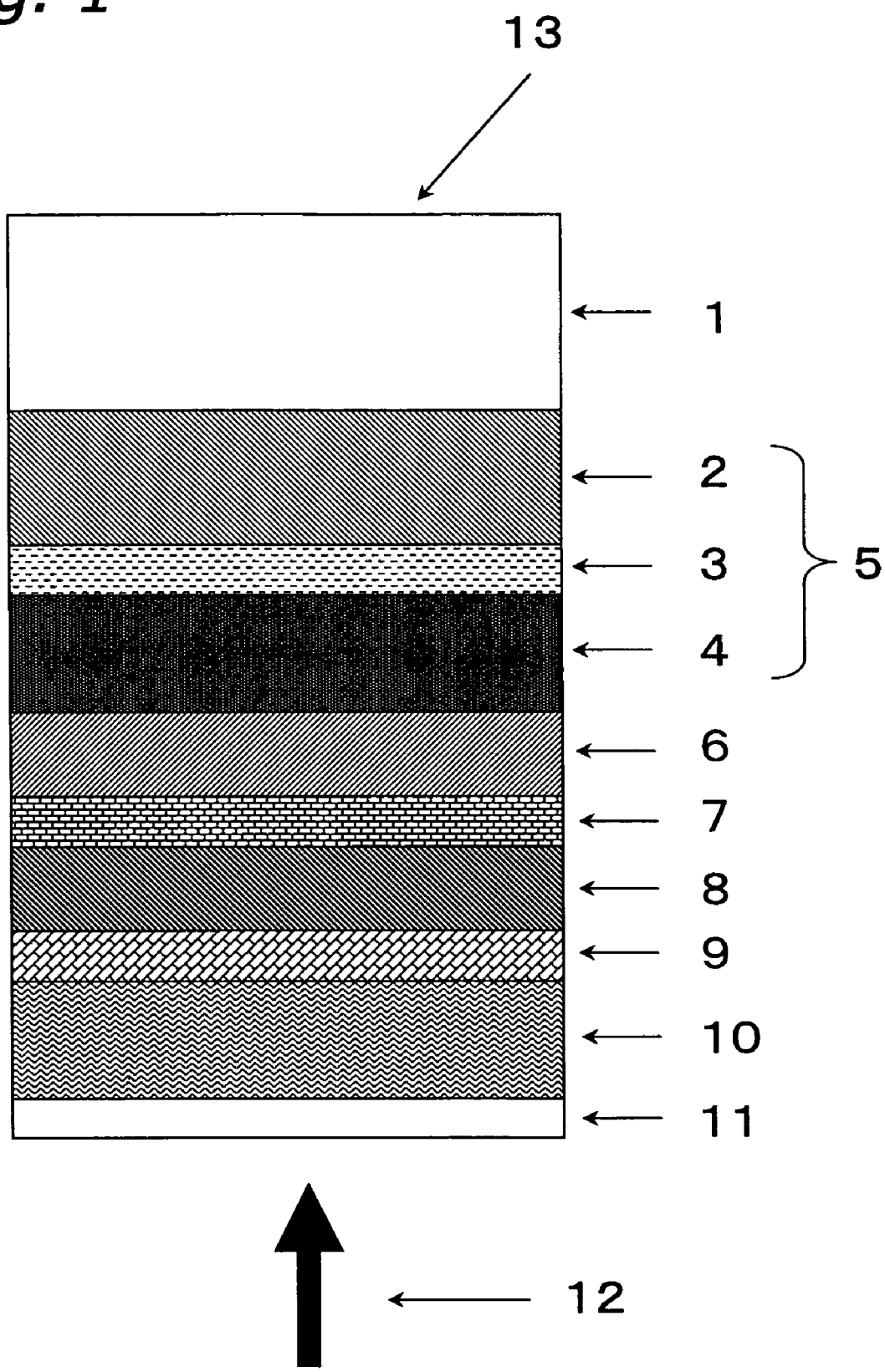
FIG. 1 shows a cross section of an example structure including a multilayered metal film in an optical information recording medium according to the present invention.

Hereinafter, preferred embodiments of the present invention will be described with reference to the attached drawings. Note that the following embodiments are merely examples, and the present invention is not limited to these embodiments. In addition, among these embodiments the same structural portions may be denoted by the same reference numerals or symbols so as to avoid overlapping description.

First Embodiment

FIG. 1 is a cross section showing a general structure of the multiple layers along the radial direction of an optical information recording medium according to the first embodiment of the present invention. As shown in FIG. 1, the optical information recording medium 13 includes a substrate 1, on which a first metal layer 2, a barrier layer 3, a second metal layer 4, an upper dielectric layer 6, an upper interface layer 7, a recording layer 8, a lower interface layer 9, a lower dielectric layer 10 and a cover layer 11 are deposited sequentially. An electron beam vapor deposition method, a sputtering method, a CVD method, a laser sputtering method or the like is used for depositing the layers including the first metal layer 2, the barrier layer 3, the second metal layer 4, the upper dielectric layer 6, the upper interface layer 7, the recording layer 8, the lower interface layer 9 and the lower dielectric layer 10.

Figure 2:
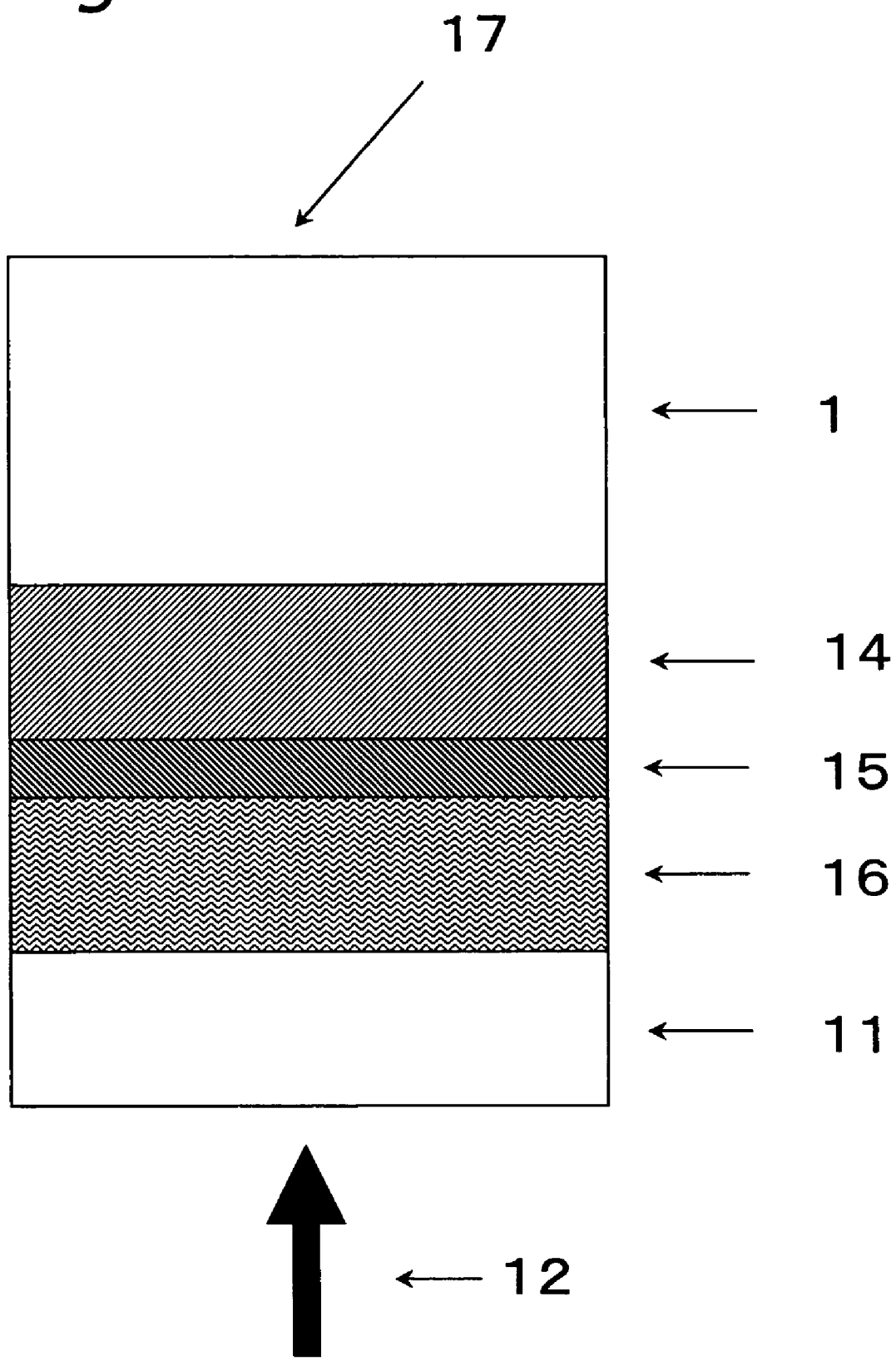
FIG. 2 shows a cross section of an example structure including a multilayer information layer in an optical information recording medium according to the present invention.

In addition, as shown in FIG. 2, the optical information recording medium 17 of the present invention includes a second information layer 14, a separating layer 15, a first information layer 16 and a cover layer 11, which are deposited on the substrate in this order. FIG. 2 shows two information layers, but it is also possible to deposit additional information layers via a separating layer. Here, at least the information layer nearest to the substrate includes at least a first metal layer, a barrier layer, a second metal layer, an upper dielectric layer, an upper interface layer, a recording layer, a lower interface layer and a lower dielectric layer deposited in this order from the side nearest to the substrate, in the same manner as the layer structure shown in FIG. 1. In addition, each of the other information layers except for the information layer nearest to the substrate may include at least a second metal layer, an upper dielectric layer, a recording layer and a lower dielectric layer deposited in this order from the side nearest to the substrate, in the same manner as the layer structure shown in FIG. 1. However, it is necessary to secure sufficient transmittance by reducing the thickness of the second metal layer so that its film thickness becomes 20 nm or less, or by eliminating the second metal layer, or by disposing an optical interference layer having a high refractive index such as 2.2 or more at the side of the second metal layer nearest to the substrate so as to improve transmittance. For recording or reproducing information, a laser beam is irradiated onto each information layer of the optical information recording medium from the cover layer side. Recording and reproducing information on the second information layer 14 is performed by a laser beam 12 that has passed through the first information layer 16.

Note that either the first information layer 16 or the second information layer 14 may be a read only memory (ROM) type information layer or a write once (WO) type information layer.

The spot diameter of the condensed laser beam 12 depends on the wavelength λ of the laser beam 12 (the shorter the wavelength λ, the smaller the spot diameter of the condensed laser beam can be). Therefore, in high density recording, the wavelength λ of the laser beam 12 is preferably 450 nm or less. In addition, a laser beam having a wavelength λ less than 350 nm can be absorbed substantially by a resin used for the separating layer 15 or by the cover layer 11. Therefore, it is preferable that the wavelength λ of the laser beam 12 is within the range of 350–450 nm.

Hereinafter, each portion making up the optical information recording medium will be described.

The substrate 1 may be a transparent disk-like polycarbonate resin, polymethyl methacrylate resin, polyolefin resin, norbornene resin, ultraviolet curing resin, glass or a combination material thereof. On the surface of the substrate 1, a guide groove may be formed for guiding the laser beam if necessary. The far side of the substrate 1 from the first metal layer 2 is preferably flat and smooth. Note that the thickness of the substrate 1 is not restricted, but a thickness within the range of approximately 0.01–1.5 mm may be suitable. In addition, if the thickness of the cover layer is approximately 0.1 mm (that enables good recording and reproducing at NA=0.85), it is preferable that the thickness of the substrate 1 is within the range of 1.05–1.15 mm.

It is preferable that the material of the cover layer 11 has a small absorption ratio for the wavelength of the laser beam 12 to be used, and a small double refractive index optically in a short wavelength region. The cover layer 11 may be a transparent disk-like polycarbonate resin, polymethyl methacrylate resin, polyolefin resin, norbornene resin, ultraviolet curing resin, glass or a combination material thereof. In addition, although the thickness of the cover layer 11 is not restricted, it is preferably within the range of 0.01–1.5 mm. If the numerical aperture of the objective lens is 0.85, it is preferable that the thickness of the cover layer 11 is 0.02 mm or less, so as to reduce the permissible range of tilt.

The separating layer 15 may also be a transparent disk-like polycarbonate resin, polymethyl methacrylate resin, polyolefin resin, norbornene resin, ultraviolet curing resin, glass or a combination material thereof, similarly to the cover layer. It is necessary that the thickness of the separating layer 15 is at least larger than the depth of focus that is determined by the numerical aperture NA of the objective lens 18 and the wavelength $\lambda$ of the laser beam 12, so that cross talk is reduced between the first information layer 16 and second information layer 14 when either is reproduced. In addition, the thickness of all information layers is required to be a value that enables the laser beam to be condensed. For example, when $\lambda$=405 nm and NA=0.85, the thickness of the separating layer 15 is required to be at least within the range of 5–50 μm. The surface of the optical separating layer 15 at the incident side of the laser beam 12 may be provided with a guide groove for guiding a laser beam if necessary.

The upper dielectric layer 6 has a function of protecting the recording layer 8 from oxidization, corrosion and deformation, a function of adjusting the optical distance so as to increase an optical absorption ratio of the recording layer 8, and a function of increasing the difference of quantity of reflected light between before and after recording to enhance a signal amplitude. The upper dielectric layer 6 may be an oxide such as $SiO_x$ (x is within the range of 0.5–2.5), $Al_2O_3$, $TiO_2$, $Ta_2O_5$, $ZrO_2$, ZnO or Te—O. In addition, a nitride such as C—N, Si—N, Al—N, Ti—N, Ta—N, Zr—N, Ge—N, Cr—N, Ge—Si—N or Ge—Cr—N can be also used. In addition, a sulphide such as ZnS, a carbide such as SiC or C can be also used. Also, a mixture of the above materials can be used. For example, ZnS—$SiO_2$ that is a mixture of ZnS and $SiO_2$ is particularly superior as a material for the upper dielectric layer 6. ZnS—$SiO_2$ is an amorphous material that has a high refractive index, a high film forming speed, good mechanical characteristics and good humidity resistance.

The film thickness of the upper dielectric layer 6 can be determined precisely by calculation in accordance with a matrix method (see "Wave motion optics", Hiroshi Kubota, Iwanami Shoten Publishers, 1971, Chapter three, for example), so as to satisfy the condition that the difference of quantity of reflected light is substantially large between the crystalline phase and the amorphous phase of the recording layer 8. A preferred film thickness of the upper dielectric layer 6 is within the range of 15–40 nm. The smaller the film thickness of the upper dielectric layer 6, the more the optical absorption ratio of recording layer is reduced. For this reason, deterioration of recording sensitivity becomes conspicuous if the film thickness is less than 15 nm. On the other hand, the larger the film thickness of the upper dielectric layer 6, the more the optical reflection factor of the optical information recording medium is reduced in the crystalline state of the recording layer. Therefore, if the film thickness is 40 nm or more, deficiency of the reflection factor becomes noticeable.

The lower dielectric layer 10 has a function of adjusting the optical distance so as to increase the optical absorption ratio of the recording layer 8 and a function of increasing the difference of quantity of reflected light between before and after recording so as to increase the signal amplitude. The lower dielectric layer 10 can be an oxide such as $SiO_2$, $Al_2O_3$, $Bi_2O_3$, $Nb_2O_5$, $TiO_2$, $Ta_2O_5$, $ZrO_2$ or ZnO. In addition, a nitride such as C—N, Si—N, Al—N, Ti—N, Ta—N, Zr—N, Ge—N, Cr—N, Ge—Si—N, Ge—Cr—N, Nb—N can be used. In addition, a sulphide such as ZnS or a carbide such as SiC can be also used. Also, a mixture of the above materials can be used. Furthermore, ZnS—$SiO_2$ that is a mixture of ZnS and $SiO_2$ is an amorphous material that has a high refractive index, a high film forming speed, good mechanical characteristics and good humidity resistance, so it is a superior material for the lower dielectric layer 10.

The film thickness of the lower dielectric layer 10 can be determined precisely by calculation in accordance with a matrix method similarly to the upper dielectric layer 6, so as to satisfy the condition that the difference of quantity of reflected light is substantially large between the crystalline phase and the amorphous phase of the recording layer 8. A preferred film thickness of the lower dielectric layer 10 is within the range of 30–100 nm. When the film thickness of the lower dielectric layer 10 is decreased and a gap between the recording layer and the substrate 1 becomes small, the substrate 1 is affected by the rising temperature of the recording layer due to the irradiating laser for recording, so that the guide groove on the substrate may be distorted. As a result, characteristics with respect to repeated recording and erasing can be substantially deteriorated. Therefore, if the film thickness is less than 30 nm, deterioration of characteristics with respect to repeated recording and erasing become noticeable. On the other hand, the thicker the film of the lower dielectric layer 10, the more an optical reflection factor of the optical information recording medium is decreased in the crystalline state of the recording layer. Therefore, if the film thickness is 100 nm or more, deficiency of the reflection factor becomes noticeable.

The upper interface layer 7 has a function of preventing mass transfer between the upper dielectric layer 6 and the recording layer 8 due to repeated recording. The upper interface layer 7 can be an oxide of Ti, Zr, Hf, V, Nb, Ta, Cr, Mo, W, Si or the like, or a composite oxide thereof, or a nitride such as C—N, Ti—N, Zr—N, Nb—N, Ta—N, Si—N, Ge—N, Cr—N, Al—N, Ge—Si—N or Ge—Cr—N, or a nitride oxide containing these systems, or a carbon or a carbide of Ti, Zr, Hf, V, Nb, Ta, Cr, Mo, W, Si or the like. It is preferable that the film thickness of the upper interface layer 7 be within the range of 1–10 nm, more preferably within the range of 2–5 nm, so as to obtain a good quality signal due to a high reproduction optical durability and a large variation of the reflection factor.

The lower interface layer 9 may be disposed between the recording layer 8 and the lower dielectric layer 10. Here, the lower interface layer 9 can be one of the materials described above as a material for the upper interface layer 7. If the thickness of the lower interface layer 9 is large, the reflection factor or the absorption ratio may alter substantially, which may affect the recording and erasing performance. Therefore, it is preferable that the film thickness of the lower interface layer 9 is within the range of 1–10 nm, more preferably within the range of 2–5 nm.

In the optical information recording medium 13 according to the present invention, the recording layer 8 may be a material that causes a structural change between the crystalline state and the amorphous state, for example a phase change material containing Te, In or Se as a main component. Well-known main components of the phase change materials include Te—Sb—Ge, Te—Ge, Te—Ge—Sn, Te—Ge—Sn—Au, Sb—Se, Sb—Te, Sb—Se—Te, In—Te, In—Se, In—Se—Tl, In—Sb, In—Sb—Se, In—Sb—Te, In—Se—Te, Te—TeO$_2$, Te—TeO$_2$—Au and Te—TeO$_2$—Pd. Among them, materials having good characteristics with respect to repeated recording and erasing and the material composition thereof were studied in experiments. Then, a good structure was found that contains the three-element system of Ge, Sb and Te as a main component. When an atomic weight ratio of the elements is shown as Ge$_x$Sb$_y$Te$_z$, a material that satisfies $0.1 \leq x \leq 0.6$, $y \leq 0.5$ and $0.4 \leq z \leq 0.65$ (here, $x+y+z=1$) is particularly good.

When the film thickness of the recording layer 8 is within the range of 5–15 nm, a sufficient C/N ratio can be obtained. If the film thickness of the recording layer 8 is less than 5 nm, a sufficient reflection factor and a sufficient variation of the reflection factor cannot be obtained, so the C/N ratio is small. In addition, if the film thickness is 15 nm or more, the thermal diffusion within a thin film surface of the recording layer 8 is so large that the C/N ratio is decreased in a high density recording.

In addition, one or more elements selected from the group consisting of O, N, F, C, S, B may be added to the material of the recording layer 8 at a composition ratio of 10 atom % or less of the entire recording layer 8 for the purpose of adjusting the thermal conductivity, an optical constant or the like or improving thermal resistance or environmental reliability if necessary.

The multilayered metal film 5 according to the present invention has an optical function of increasing the quantity of light absorbed by the recording layer 8. In addition, the multilayered metal film 5 also has a thermal function of quickly diffusing heat that is generated in the recording layer 8 so as to facilitate changing the recording layer 8 to an amorphous state. Furthermore, the multilayered metal film 5 also has a function of protecting the multilayer film from the environment it is to be used in.

The multilayered metal film 5 has a laminated structure formed of three layers, which are a first metal layer 2, a barrier layer 3 and a second metal layer 4 arranged in this order from the substrate side.

The second metal layer 4 has an optical role of increasing the quantity of light absorbed by the recording layer 8. A material containing Al as a main component is characterized as follows.

(1) Thermal conductivity is small compared with a material containing Ag as a main component.

(2) If it is disposed next to a layer containing Ag as a main component, Ag diffuses gradually into the Al layer, even at room temperature, resulting in decrease of the reflection factor.

(3) Al is a material that has a tendency to have a columnar structure, so surface roughness can be a problem.

Regarding the above characteristic (1), the first metal layer 2 containing Ag (having a large thermal conductivity) as a main component is disposed between the substrate 1 and the second metal layer 4, so that the cooling ability of the multilayered metal film 5 can be improved.

Regarding the above characteristic (2), the barrier layer 3 is disposed between the second metal layer 4 and the first metal layer 2 containing Ag as a main component, so that reduction of the reflection factor can be prevented.

Regarding the above characteristic (3), an alloy is used for the second metal layer 4, which contains Al and an additive of Cu, Ag, Au, B, Bi, Cd, Ga, Ge, Pb, Sn or Zn within the range of 0.1–15.0 atom %, Ni, Si or Pt within the range of 0.1–10.0 atom %, or Ta, Cr or Ti within the range of 0.1–7.5 atom %, more preferably, Cu, Ag, Au, B, Bi, Cd, Ga, Ge, Pb, Sn or Zn within the range of 0.1–10.0 atom %, Ni, Si or Pt within the range of 0.1–7.5 atom %, or Ta, Cr or Ti within the range of 0.1–5.0 atom %. Thus, the crystal grain diameter can be decreased without deterioration of the C/N ratio due to reduction of the thermal conductivity or increase of noise. In addition, it is also effective to use a material for the barrier layer which has a crystal grain diameter smaller than that of a material containing Al and a metal element as main components, or to use a material that becomes amorphous after film deposition. It is particularly preferable that the second metal layer 4 is an alloy containing Al and an additive of Cu at 4 atom % or Ni at 4 atom % from the viewpoint of thermal conductivity and surface flatness.

The film thickness of the second metal layer 4 is preferably within the range of 10–100 nm, more preferably within the range of 10–30 nm. If the film thickness of the second metal layer 4 is less than 10 nm, thermal conductivity is decreased, which is not preferable. In addition, if the film thickness of the second metal layer 4 is 100 nm or more, the crystal grain diameter increases and noise is increased resulting in deterioration of the C/N ratio, which causes adverse affects on disk characteristics and is not preferable.

The barrier layer 3 has the following functions as described above.

(1) It acts as a barrier to a reaction between Ag (that is a main component of the first metal layer 2) and Al (that is a main component of the second metal layer 4).

(2) It becomes a ground of the second metal layer 4. Therefore, a material having a crystal grain diameter smaller than the material containing Al and a metal element as main components or a material having an amorphous structure is used, so that the crystal grain diameter of the material containing Al and a metal element as main components can be decreased.

In order to achieve these functions, the barrier layer 3 may be a material containing at least one element selected from the group consisting of C, Si, Cr, Ni, Mo, W and Ta as a main component. In addition, a material containing an oxide or a nitride of at least one element selected from the group consisting of Al, Ti, Zr, Hf, Ta, Cr and Si as a main component can be also used. It is particularly preferable that the barrier layer 3 is a material containing Ni or Cr from the viewpoints of its ability as a barrier to reactions between Ag and Al and the thermal conductivity.

The film thickness of the barrier layer 3 is preferably within the range of 1–20 nm, more preferably within the range of 3–10 nm. If the film thickness of the barrier layer 3 is less than 1 nm, it cannot perform the role as a barrier layer for suppressing the reaction between Ag and Al, which is not preferable. In addition, if the film thickness of the barrier layer 3 is 20 nm or more, the cooling ability of the multilayered metal film 5 is lowered, which is not preferable.

The first metal layer 2 may be a material that is pure Ag having a high thermal conductivity. In addition, an alloy can be used that contains Ag as a main component and one or more elements as additives for improving humidity resistance or adjusting thermal conductivity. More specifically, an alloy such as Ag—Pd, Ag—Pd—Cu, Ag—Pd—Ti, Ag—Ru—Au, Ag—Nd—Au or Ag—Nd—Cu can be used, and Ag—Nd—Au is particularly preferable from the viewpoint of corrosion resistance. Particularly, an alloy of Ag has a large thermal conductivity and is superior in humidity resistance, so is preferable as the material of the first metal layer 2.

The film thickness of the first metal layer 2 is preferably within the range of 20–300 nm, more preferably within the range of 50–100 nm. If the film thickness of the first metal layer 2 is less than 20 nm, the cooling ability is insufficient, which is not preferable. In addition, if the film thickness of the first metal layer 2 is larger than 200 nm, the reflection factor may be saturated. Therefore, the reflection factor is not improved if the film thickness of the first metal layer 2 is larger than that value. Accordingly, deposition of the first metal layer 2 to 200 nm or more is not preferable from the viewpoint of productivity and cost of materials.

The second metal layer 4 may be an alloy containing Al as a main component and an additive that is at least one element selected from the group consisting of Cu, Ag, Au, B, Bi, Cd, Ga, Ge, Pb, Sn or Zn within the range of 1.0–15.0 atom %, or Si or Pt within the range of 1.0–10.0 atom %, more preferably the group consisting of Cu, Ag, Au, B, Bi, Cd, Ga, Ge, Pb, Sn or Zn within the range of 1.0–10.0 atom, or Si or Pt within the range of 1.0–5.0 atom %.

Second Embodiment

Figure 4:
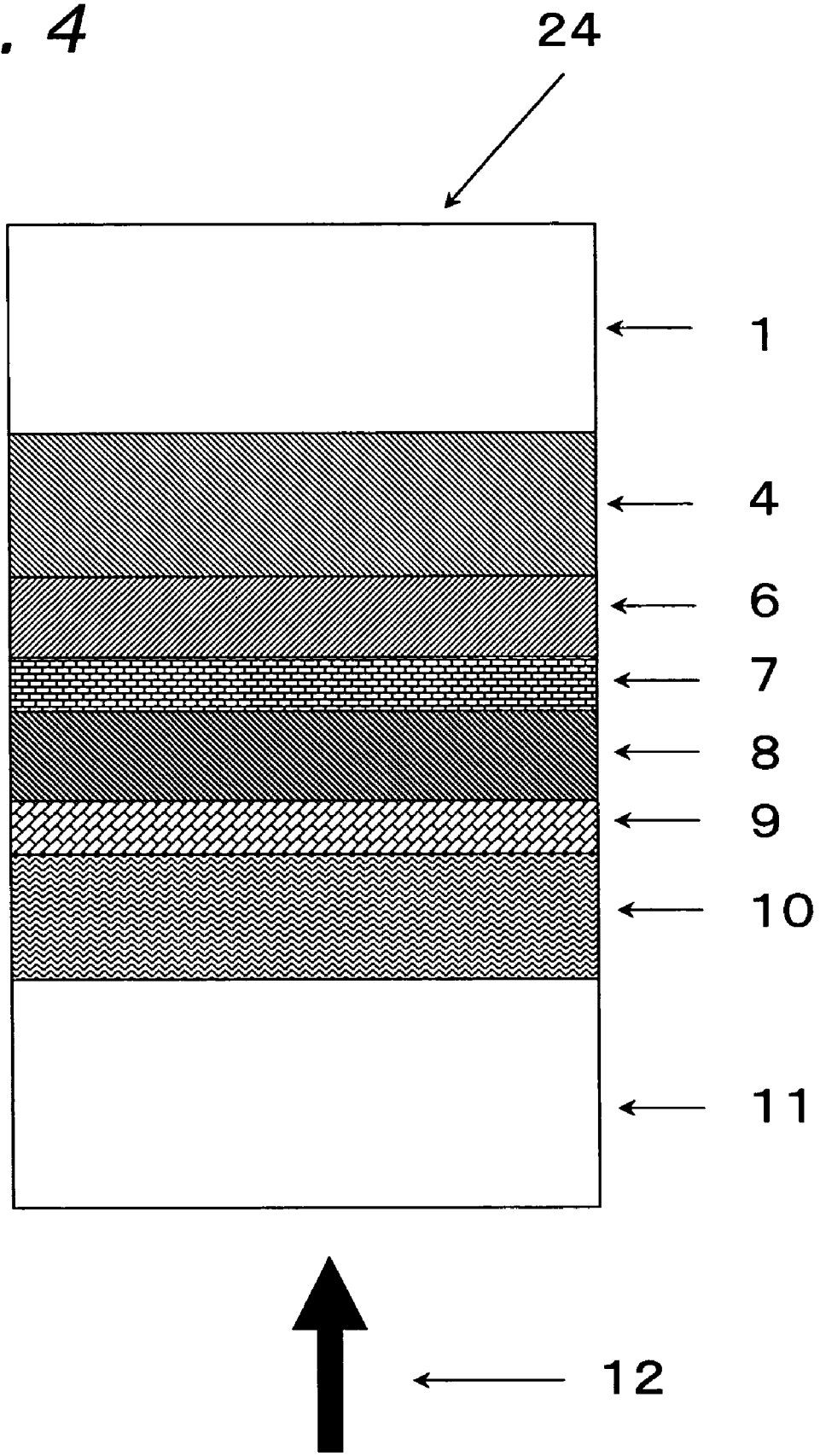
FIG. 4 shows a cross section of an example structure including a single layer metal film in an optical information recording medium according to the present invention.

FIG. 4 is a cross section of a laminated layer structure along the radial direction of an optical information recording medium according to a second embodiment of the present invention. As shown in FIG. 4, the optical information recording medium 24 includes a substrate 1, on which a metal layer 4, an upper dielectric layer 6, an upper interface layer 7, a recording layer 8, a lower interface layer 9, a lower dielectric layer 10 and a cover layer 11 are deposited sequentially. In the same manner as the first embodiment, an electron beam vapor deposition method, a sputtering method, a CVD method, a laser sputtering method or the like is used for depositing the layers including the metal layer 4, the upper dielectric layer 6, the upper interface layer 7, the recording layer 8, the lower interface layer 9, the lower dielectric layer 10.

In addition, in the same manner as the medium 13 and as shown in FIG. 2, the optical information recording medium 24 of the present invention is also structured by depositing a second information layer 14, a separating layer 15, a first information layer 16 and a cover layer 11 on the substrate in this order. Although two information layers are shown in FIG. 2, it is possible to provide an additional information layer via a separating layer. Here, at least the information layer closest to the substrate includes at least a metal layer, an upper dielectric layer, an upper interface layer, a recording layer, a lower interface layer and a lower dielectric layer arranged in this order from the side nearest to the substrate, in the same manner as the layer structure shown in FIG. 4. In addition, information layers other than the information layer closest to the substrate can include at least a metal layer, an upper dielectric layer, a recording layer and a lower dielectric layer arranged in this order from the side nearest to the substrate, in the same manner as the layer structure shown in FIG. 4. However, here it is necessary to decrease the film thickness of the metal layer to 20 nm or less for example so as to obtain sufficient transmittance. Otherwise, it is necessary to eliminate the metal layer or to provide an optical interference layer having a high refractive index, for example 2.2 or more, on the substrate side of the metal layer so as to improve the transmittance. A laser beam is irradiated onto the information layers of the optical information recording medium from the cover layer side for recording or reproducing information. Recording or reproducing information on the second information layer 14 is performed by the laser beam 12 that has passed through the first information layer 16.

Note that either the first information layer 16 or the second information layer 14 can be a read only memory (ROM) information layer or a write once (WO) information layer.

The wavelength λ of the laser beam 12 is determined in the same way as in the first embodiment.

Next, each structural portion of the optical information recording medium will be described. Note that structures of the substrate 1, the cover layer 11, the separating layer 15, the upper dielectric layer 6, the lower dielectric layer 10 and the upper interface layer 7 are the same as in the first embodiment.

In the present invention, it is preferable that the film thickness of the recording layer 8 be within the range of 5–15 nm for obtaining a sufficient C/N ratio. If the film thickness is less than 5 nm, a sufficient reflection factor and a sufficient variation of the reflection factor cannot be obtained, so the C/N ratio is low. In addition, if the film thickness is 15 nm or more, heat diffusion within a surface of the thin film of the recording layer 8 is so large that the C/N ratio becomes low in high density recording.

In addition, one or more elements selected from the group consisting of O, N, F, C, S and B may be added to the material of the recording layer 8 at a ratio of 10 atom % or less of the entire recording layer 5, for the purpose of adjusting the thermal conductivity or an optical constant, or improving thermal resistance or environmental reliability if necessary.

The metal layer 4 of the present invention has an optical function (which functions as a reflection layer) of increasing the quantity of light absorbed by the recording layer 8, and a thermal function (which functions as a radiation layer) of rapidly diffusing heat generated in the recording layer 8 so that the recording layer 8 can easily change to an amorphous state. Furthermore, the metal layer 4 also has a function of protecting the multilayer film from the environment it is to be used in. This metal layer 4 is an Al alloy in the same manner as in the first embodiment. An Al alloy has the advantage that it is resistant to corrosion, unlike Ag, even if the upper dielectric layer 3 is ZnS or ZnS—$SiO_2$. As a result, it is not necessary to provide a barrier layer, and the number of layers can be reduced so that the cost can be controlled to be low. However, the use of an Al alloy for the reflection layer may cause the following two problems.

(1) Al is a material that has a tendency to have a columnar structure, so the surface thereof is likely to be uneven.

(2) The thermal conductivity is smaller than that of an Ag alloy, so interference between marks is large during recording.

If an additive element is added to Al so as to solve these problems, the columnar structure can be suppressed and the unevenness of the surface can be reduced. However, if a second component is added to the conventional Al alloy, a problem occurs that the thermal conductivity falls substantially so that interference between marks is large during recording. Therefore, a second component has been studied that does not decrease the thermal conductivity, even if it is added to the Al alloy.

In the present invention, the metal layer 4 is an alloy that contains Al as a main component and an additive that is at least one element selected from the group consisting of Cu, Ag, Au, B, Bi, Cd, Ga, Ge, Pb, Sn or Zn within the range of 1.0–15.0 atom %, or Si or Pt within the range of 1.0–10.0 atom %, more preferably the group consisting of Cu, Ag, Au, B, Bi, Cd, Ga, Ge, Pb, Sn or Zn within the range of 1.0–10.0 atom, or Si or Pt within the range of 1.0–5.0 atom %, so that surface unevenness is reduced and a high thermal conductivity can be maintained for achieving the above two tasks. Note that Au, Pt and Ga have the problem of cost, while Cd and Pb have environmental problems, and thus they are not superior to other elements.

It is preferable that the film thickness of the metal layer 4 is within the range 20–300 nm as described below. If the film thickness is smaller than 20 nm, thermal conductivity of the crystalline portion is reduced, which is not preferable. In addition, if the film thickness is more than 300 nm, cooling ability is not improved, even if the film becomes thicker than this value. Therefore, deposition of the metal layer 4 to 300 nm or more is not preferable from the viewpoint of productivity and cost of materials. It is particularly preferable that the metal layer 4 has an alloy containing Al as a main component and a second component that is at least one element selected from the group consisting of Cu at 4 atom % or Si or Pt less than 2 atom % from the viewpoint of thermal conductivity and surface evenness.

Note that materials and compositions of layers of the multilayer thin film described in the above first and second embodiments can be studied by a method such as an Auger electron spectral method, an X-ray photoelectron spectral method or a second ion mass spectrometry method (see "Thin film formation handbook", Japan Society of Applied Physics, Thin film and surface physics blanch institute, Kyoritsu publishing company, 1991, for example).

Third Embodiment

The optical information recording medium 13 in the first embodiment and the optical information recording medium 24 in the second embodiment can be manufactured by the following method.

The method for manufacturing the medium according to the present invention will be described using an example of medium 13 that has a multilayered metal film. The method for manufacturing the medium 24 having a single layer metal film is similar to the method for manufacturing the medium 13 except for the first metal layer and the barrier layer portion. The substrate 1 (having a thickness of 1.1 mm, for example), on which a guide groove is provided for guiding the laser beam 12, is placed on a film deposition device. The film deposition device forms layers in the order of a first step for depositing a first metal layer 2 of the present invention, a second step for depositing the barrier layer 3, a third step for depositing the second metal layer 4, a fourth step for depositing the upper dielectric layer 6, a fifth step for depositing the upper interface layer 7, a sixth step for depositing the recording layer 8, a seventh step for depositing the lower interface layer 9 and an eighth step for depositing the lower dielectric layer 10.

First, in the first step of the present invention, the first metal layer 2 is deposited on the substrate 1 (on the side on which the guide groove is formed). A DC power source or a high frequency power source is used in the first step for sputtering a target of a material containing Ag as a main component, while introducing Ar gas.

Next, in the second step, the barrier layer 3 is deposited on the first metal layer 2. A DC power source or a high frequency power source is used in the second step for sputtering a target of a single material containing C, Si, Cr, Ni, Mo, W or Ta, or a mixture of these materials, or a dielectric material, while introducing Ar gas.

Next, in the third step, the second metal layer 4 is deposited on the barrier layer 3. A DC power source or a high frequency power source is used in the third step for sputtering a target of Al—M (M=Cu, Ni or Si) while introducing Ar gas.

Next, in the fourth step, the upper dielectric layer 6 is deposited on the second metal layer 4. A high frequency power source is used in the fourth step for sputtering a target of $ZnS$—$SiO_2$ while introducing Ar gas or a mixture gas of Ar gas and $N_2$ gas or a mixture gas of Ar gas and $O_2$ gas.

Next, in the fifth step, the upper interface layer 7 is deposited on the upper dielectric layer 6. A DC power source or a high frequency power source is used in the fifth step for sputtering a target of C for example, while introducing Ar gas or a mixture gas of Ar gas and $N_2$ gas.

Next, in the sixth step, the recording layer 8 is deposited on the upper interface layer 7. A DC power source is used in the sixth step for sputtering a target of any one of Ge—Sb—Te, Ge—Sn—Sb—Te, Ag—In—Sb—Te and Sb—Te, while introducing Ar gas or a mixture gas of Ar gas and $N_2$ gas. The recording layer 5 after the deposition is in an amorphous state.

Next, in the seventh step, the lower interface layer 9 is deposited on the recording layer 8. A high frequency power source is used in the seventh step for sputtering a target of a material containing an oxide of at least one element selected from the group consisting of Ti, Zr, Hf, Nb, Ta, Cr and Si, while introducing Ar gas. In addition, a sputtering target of a material containing an oxide of Si may be used. Further, a sputtering target of a material containing $ZrO_2$—$SiO_2$—$Cr_2O_3$ as a main component can be used.

Finally, in the eighth step, the lower dielectric layer 10 is deposited on the lower interface layer 9. A high frequency power source is used in the eighth step for sputtering a target of $ZnS$—$SiO_2$ while introducing Ar gas or a mixture gas of Ar gas and $N_2$ gas or a mixture gas of Ar gas and $O_2$ gas.

After depositing the lower dielectric layer 10, the substrate 1 on which deposition is performed up to the lower dielectric layer 10 is taken out of the film deposition device. The substrate 1 on which deposition is performed up to the lower dielectric layer 10 is placed in an adhering step, and an ultraviolet curing resin is applied onto the lower dielectric layer 10 by a spin coat method, for example. Then, a polycarbonate sheet for example is brought into close contact with the resin applied surface, and ultraviolet rays are irradiated from the polycarbonate sheet side so that the resin is cured.

After finishing the adhering step, an initialization step is performed if necessary. In the initialization, the recording layer 8 that is in an amorphous state is heated by a semiconductor laser for example up to a crystallization temperature or higher, to be crystallized. The initialization step may be performed before the adhering step. In this way, the optical information recording medium 13 can be manufactured.

Fourth Embodiment

Figure 3:
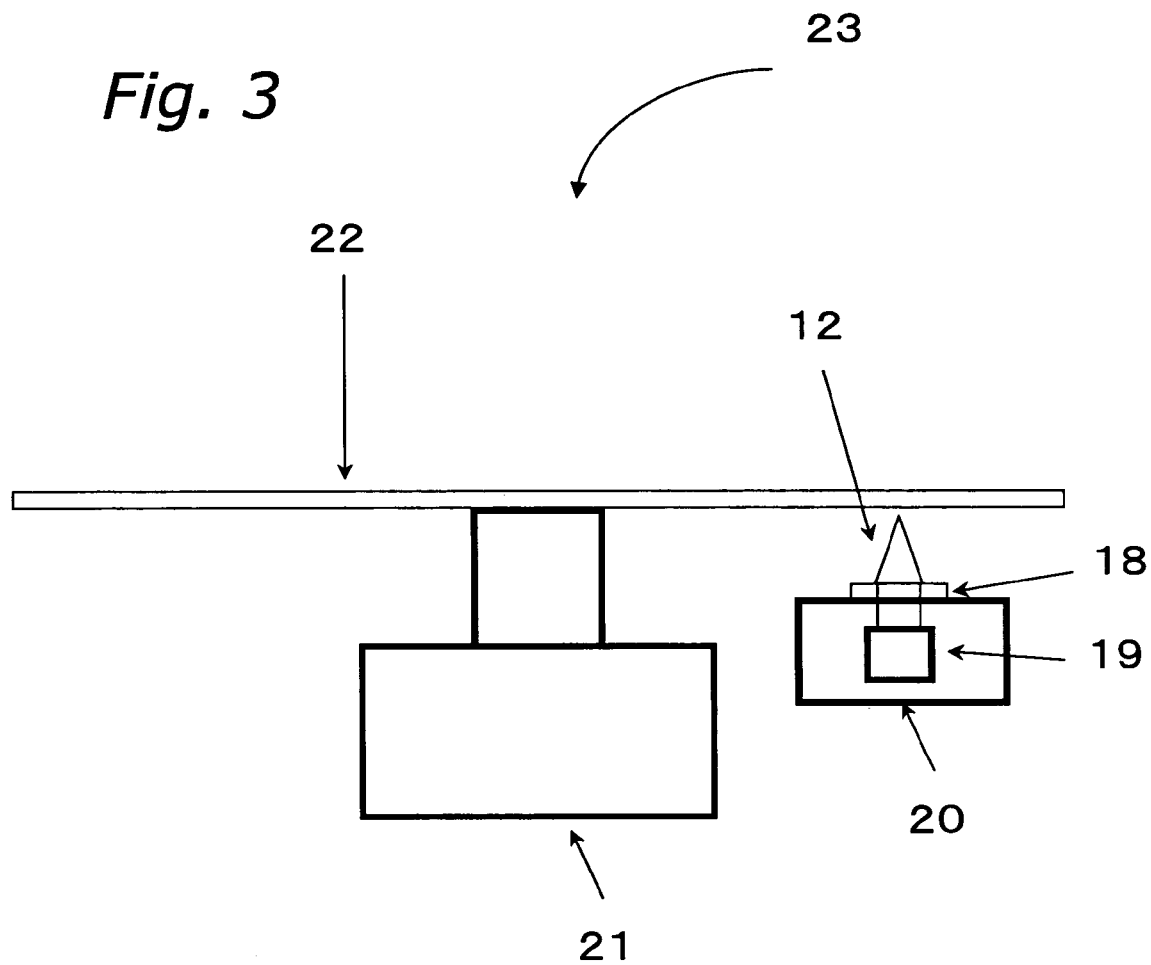
FIG. 3 shows a schematic representation of a part of a structure of a recording and reproducing device that is used for recording and reproducing information on the optical information recording medium according to the present invention.

A method for recording and reproducing information on the optical information recording medium 13, 17 or 24 of the present invention described in the first embodiment will be described. A recording and reproducing device that is used for the method for recording and reproducing information according to the present invention will also be described. A structure of a part of the recording and reproducing device 23 that is used for the method for recording and reproducing information according to the present invention is schematically shown in FIG. 3. As shown in FIG. 3, the recording and reproducing device 23 includes a spindle motor 21 for rotating the optical information recording medium 22, an optical head 20 having a semiconductor laser 19, and an objective lens 18 for condensing a laser beam 12 emitted by the semiconductor laser 19.

Recording, erasing and rewriting information on the optical information recording medium 13, 17 or 24 are performed by modulating the power of the laser beam 12 between a high power that is a peak power (Pp (mW)) and a low power that is a bias power (Pb (mW)). When irradiating the laser beam 12 at the peak power, an amorphous phase is formed locally at a portion of the recording layer 8, and the amorphous phase becomes a recording mark. Between recording marks, the laser beam 12 is irradiated at the bias power so that a crystalline phase (an erased portion) is formed. Note that when irradiating the laser beam 12 at the peak power, a so-called multipulse signal that is a pulse train is commonly used. Note that the multipulse signal can be modulated only by the power levels of the peak power and the bias power or modulated by power levels within the range from 0 mW to the peak power.

In addition, reproduction of an information signal is performed by irradiating the laser beam 12 at a reproduction power onto the optical information recording medium 13, 17 or 24 and by reading a signal from the optical information recording medium 13, 17 or 24 with a detector. The reproduction power (Pr (mW)) is set to a value lower than either the peak power or the bias power, so that the optical state of the recording mark is not affected by the irradiation of the laser beam 12 at that power level, and the quantity of light reflected by the optical information recording medium 13, 17 or 24 can be sufficient for reproducing the recording mark.

It is preferable that the numerical aperture NA of the objective lens 18 be within the range of 0.5–1.1 (more preferably within the range of 0.6–1.0) so as to adjust the spot diameter of the laser beam within the range of 0.4–0.7 µm. The wavelength of the laser beam 12 is preferably 450 nm or less (more preferably within the range of 350–450 nm). The linear speed of the optical information recording medium 13, 17 or 24 during recording information is preferably within the range of 3–20 meters per second (more preferably within the range of 4–15 meters per second) so that generation of crystallization by the reproduction light is kept minimal and a sufficient erasing ratio is obtained.

For the optical information recording medium 17, when recording information on the first information layer 16, a focal point of the laser beam 12 is adjusted on the recording layer of the first information layer, and the laser beam 12 that has passed through the cover layer 11 is used for recording information. The reproduction uses the laser beam 12 that has been reflected by the recording layer of the first information layer and has passed through the cover layer 11. When recording information on the second information layer 14, a focal point of the laser beam 12 is adjusted on the recording layer of the second information layer, and the laser beam 12 that has passed through the cover layer 11, the first information layer 16 and separating layer 15 is used for recording information. The reproduction uses the laser beam 12 that has been reflected by the recording layer of the second information layer and has passed through the separating layer 15, the first information layer 16 and cover layer 11.

Note that if the substrate 1 or the separating layer 15 is provided with a guide groove for leading the laser beam 12, information may be recorded on the groove surface of the near side or on the land surface of the side furthest from the incident side of the laser beam 12. It is possible to record information on both the groove and the land.

In order to evaluate the recording performance, a mark of length 2T is recorded by the (8–15) modulation method, and a C/N ratio (Carrier to Noise Ratio: CNR) is measured by a spectrum analyzer. In order to evaluate erasing performance, a mark of length 2T is recorded by the (8–15) modulation method, and amplitude is measured by a spectrum analyzer. Then, a mark of length 9T is overwritten, and amplitude of the 2T signal is measured again so as to calculate the attenuation factor of the 2T signal. Hereinafter, the attenuation factor of this 2T signal is referred to as the erasing ratio.

EXAMPLE 1

Hereinafter, the present invention is further described in detail with reference to examples.

This example shows recording and reproduction characteristics of the optical information recording media 13 and 24 of the present invention, particularly dependency between the metal layer material containing Al, the film thickness of the metal layer and the C/N ratio.

EXAMPLE 1-1

First, the optical information recording medium 13 having the multilayered metal film will be described.

A plurality of media 13 having different materials of the second metal layer 4 were produced, and samples with the cover layer 11 were produced. The C/N ratio was measured for each of the produced samples.

The sample was produced as follows. First, a polycarbonate substrate (having a diameter of 120 mm, a thickness of 1100 µm and a refractive index of 1.62) was prepared. Then, on the polycarbonate substrate, the following layers were deposited sequentially by a sputtering method. The first metal layer 2 was AgPdCu (the thickness was 80 nm). The barrier layer 3 was Ni (the thickness was 5 nm). The second metal layer 4 and the upper dielectric layer 6 were ZnS—SiO$_2$ (the thickness was 30 nm). The upper interface layer 7 was C (the thickness was 2 nm). The recording layer 8 was GeSbTe (the thickness was 9 nm). The lower interface layer 9 was Zr—Si—Cr—O layer (the thickness was 5 nm). The lower dielectric layer 10 was ZnS—SiO$_2$ (the thickness was 60 nm). The second metal layer 4 was Al—Cu, Al—Ni and Al—Cr. Finally, an ultraviolet curing resin was applied onto the lower dielectric layer 10, and a polycarbonate substrate (the diameter was 120 mm, and the thickness was 90 µm) was brought into intimate contact with the lower dielectric layer 10 for spin coating. After that, ultraviolet rays were irradiated so that the resin was cured to form the optical information recording medium 13. In this way, a plurality of samples having different materials and film thicknesses of the second metal layer 4 were produced. The disk obtained in this way was first processed by the initialization step so that the recording layer 8 was crystallized. Combinations of materials and film thicknesses of the second metal layer of the manufactured disk are shown in Table 1.

TABLE 1

| Disk No. | Material of reflection layer | Film thickness of reflection layer [nm] | C/N ratio | decision |
|---|---|---|---|---|
| 1 | Al-0.1 at % Cu | 20 | superior | superior |
| 2 | Al-1.0 at % Cu | 20 | superior | superior |
| 3 | Al-5.0 at % Cu | 20 | superior | superior |
| 4 | Al-5.0 at % Cu | 5 | insufficient | insufficient |
| 5 | Al-5.0 at % Cu | 10 | good | good |
| 6 | Al-5.0 at % Cu | 100 | good | good |
| 7 | Al-5.0 at % Cu | 120 | insufficient | insufficient |
| 8 | Al-10.0 at % Cu | 20 | superior | superior |
| 9 | Al-15.0 at % Cu | 20 | good | good |
| 10 | Al-20.0 at % Cu | 20 | insufficient | insufficient |
| 11 | Al-0.1 at % Ni | 20 | superior | superior |
| 12 | Al-1.0 at % Ni | 20 | superior | superior |
| 13 | Al-5.0 at % Ni | 20 | superior | superior |
| 14 | Al-7.5 at % Ni | 20 | superior | superior |
| 15 | Al-10.0 at % Ni | 20 | good | good |
| 16 | Al-15.0 at % Ni | 20 | insufficient | insufficient |
| 17 | Al-0.1 at % Cr | 20 | superior | superior |
| 18 | Al-1.0 at % Cr | 20 | superior | superior |
| 19 | Al-2.5 at % Cr | 20 | superior | superior |
| 20 | Al-5.0 at % Cr | 20 | superior | superior |
| 21 | Al-7.5 at % Cr | 20 | good | good |
| 22 | Al-10.0 at % Cr | 20 | insufficient | insufficient |

A single 12.2 MHz signal and a single 3.3 MHz signal were recorded alternately on a groove of the above disk, i.e., a protruding portion viewed from the incident side of the laser beam, by using an optical system having wavelength 405 nm and lens numerical aperture of 0.85, while the disk was rotated at the linear speed of 4.5 meters per second. A pulse waveform that was used for recording was a rectangular pulse waveform that was modulated between the peak power P1 and the bias power P2.

Under these conditions, the 12.2 MHz and 3.3 MHz signals were recorded alternately a total of ten times on new tracks, and then the 12.2 MHz signal was overwritten. After that, the C/N ratio was measured by using a spectrum analyzer. The C/N ratios of the disks obtained in this way are also shown in Table 1. Note that the C/N ratio is distinguished to be superior if it is 55 dB or more, good if it is 54 dB or more, and insufficient if it is less than 54 dB.

According to Table 1, it was found that if the second metal layer 4 is a material of Al—Cu (the film thickness is 20 nm), then the C/N ratio is 54.0 dB or more for the disks 1, 2, 3, 8 and 9 having the quantity of Cu less than 15.0 atom %. Particularly, if it is less than 10.0 atom %, then the C/N ratio is 55 dB or more. In addition, it was found that for the disks 4 and 7 having the quantity of Cu at 5.0 atom %, the C/N ratio is less than 54.0 dB and thus is insufficient for disk characteristics. Note that comparing the disks 3–7 having the quantity of Cu at 5 atom %, the C/N ratio is insufficient for the disk 4 having the reflection layer film whose thickness was 5 nm and for the disk 7 having the reflection layer film whose thickness was 120 nm. Therefore, it is understood that the thickness of the reflection layer film is preferably within the range of 10–100 nm. Furthermore, the range of 10–30 nm is particularly preferable.

In addition, was is found that when the second metal layer 4 is a material of Al—Ni (the film thickness is 20 nm), the C/N ratio is 54.0 dB or more for the disks 11–15 having the quantity of Ni less than 10.0 atom %. In particular the C/N ratio is 55.0 dB or more for the disks 11–14 having the quantity of Ni less than 7.5 atom %. It was found that the C/N ratio is less than 54.0 dB which is insufficient as a disk characteristic for the disk 16 having the quantity of Ni at 15.0 atom %.

Furthermore, it was found that when the second metal layer 4 is a material of Al—Cr (the film thickness is 20 nm), then the C/N ratio is 54.0 dB or more for the disks 17–21 having the quantity of Cr less than 7.5 atom %. In particular the C/N ratio was 55.0 dB or more for the disks 17–20 having quantity of Cr less than 5.0 atom %. It was found that the C/N ratio is less than 54.0 dB which is insufficient as a disk characteristic for the disk 22 having the quantity of Cr at 10.0 atom %.

In consideration of the above results, it is preferable for the C/N ratio to be at least more than 54.0 dB, that the second metal layer be Al and at least one metal element selected from the group consisting of Cu between 0.1–15.0 atom %, Ni between 0.1–10.0 atom % and Cr between 0.1–7.5 atom %, from this example.

EXAMPLE 1-2

Next, the optical information recording medium 24 having the single layer metal film will be described.

A plurality of media 24 having different materials for the metal layer 4 were manufactured, and samples having the cover layer 11 were manufactured. C/N ratios were measured for the manufactured samples in the same manner as in Example 1-1. The method for producing the sample was the same as in Example 1-1 except for the first metal layer 2 and the barrier layer 3. Combinations of materials and C/N ratios of the manufactured disk are shown in Table 2.

TABLE 2

| Disk No. | Material of reflection layer | Film thickness of reflection layer [nm] | C/N ratio | decision |
|---|---|---|---|---|
| 1 | Al-1.0 at % Cu | 20 | superior | superior |
| 2 | Al-5.0 at % Cu | 20 | superior | superior |
| 7 | Al-10.0 at % Cu | 20 | superior | superior |
| 8 | Al-15.0 at % Cu | 20 | good | good |
| 9 | Al-20.0 at % Cu | 20 | insufficient | insufficient |
| 10 | Al-1.0 at % Si | 20 | superior | superior |
| 11 | Al-5.0 at % Si | 20 | superior | superior |
| 12 | Al-7.5 at % Si | 20 | good | good |
| 13 | Al-10.0 at % Si | 20 | good | good |
| 14 | Al-15.0 at % Si | 20 | insufficient | insufficient |

As shown in Table 2, it was found that if the metal layer 4 is a material of Al—Cu (the film thickness is 20 nm), then the C/N ratio is 54.0 dB or more for the disks 1, 2, 7 and 8 having the quantity of Cu less than 15.0 atom %. In particular, if the quantity of Cu is less than 10.0 atom %, then the C/N ratio is 55 dB or more. In addition, the C/N ratio was less than 54.0 dB which is insufficient as a disk characteristic for the disk 9 having the quantity of Cu at 20.0 atom %.

In addition, if the metal layer 4 was a material of Al—Si (the film thickness is 20 nm), then the C/N ratio was 54.0 dB or more for the disks 10–13 having the quantity of Si less than 10.0 atom %. In particular the C/N ratio was 55.0 dB or more for the disks 10 and 11 having the quantity of Si less than 5.0 atom %. It was found that the C/N ratio is less than 54.0 dB which is insufficient as a disk characteristic for the disk 14 having the quantity of Si at 15.0 atom %.

Considering the above results, it is preferable for the C/N ratio to be at least more than 54.0 dB, that the metal layer is Al and at least one metal element selected from the group consisting of Cu between 1.0–15.0 atom % and Si between 1.0–10.0 atom %, from this example.

EXAMPLE 2

This example shows recording and reproduction characteristics of the optical information recording media 13 according to the present invention, particularly the dependency of the C/N ratio and decrease of the reflection factor after accelerated tests on the film thickness of the barrier layer 3. More specifically, a plurality of samples of the optical information recording medium 13 having the barrier layer 3 of a material of Ni and different film thicknesses were manufactured by the same manner as in Example 1. Combinations of materials and film thicknesses of the barrier layer of the manufactured disk are shown in Table 3.

TABLE 3

| Disk No. | Material of barrier layer | Film thickness of barrier layer [nm] | C/N ratio | Decrease of reflection factor after accelerated test | decision |
|---|---|---|---|---|---|
| 20 | Ni | 0.5 | good | insufficient | insufficient |
| 21 | Ni | 1 | good | good | good |
| 22 | Ni | 10 | good | good | good |
| 23 | Ni | 20 | good | good | good |
| 24 | Ni | 25 | insufficient | good | insufficient |

The C/N ratios of the above samples were measured in the same manner as in Example 1. The obtained C/N ratios of the disks are also shown in Table 3. Note that the C/N ratio is distinguished to be good if it is 54 dB or more, and insufficient if it is less than 54 dB. In addition, as described above, if the barrier layer 3 is not provided, Ag diffuses into the Al layer so that the reflection factor is decreased, even at room temperature. Therefore, dependency of the barrier layer 3 on the film thickness was evaluated to find the diffusion property of Ag by measuring the reflection factor after the accelerated test. If the reflection factor decreased after the accelerated test, it means that the barrier layer 3 could not prevent Ag diffusion, which is not preferable.

Hereinafter, conditions for evaluating the decrease of the reflection factor will be described.

The optical information recording media 13 having the barrier layer materials of different film thicknesses after finishing the initialization step were left to stand in a thermostatic chamber at a temperature of 90 degrees C. and relative humidity of 20% for 50 hours. After this, it was evaluated whether the reflection factor lowered or not by measuring the reflection factor using the recording and reproducing device 23. The obtained results of whether the reflection factor of the disks showed a decrease after the accelerated test are also shown in Table 3. Note that the decrease of the reflection factor after the accelerated test is distinguished to be good if it is less than 2%, and insufficient if it is 2% or more.

As shown in Table 3, the decrease of the reflection factor after the accelerated test is 2% or more for the disk 20 in which the film thickness of the barrier layer 3 is 0.5 nm, and the C/N ratio is 54.0 dB or more for the disks 21–23 in which the film thickness is less than 20 nm. In addition, it was found that the C/N ratio is less than 54.0 dB which is insufficient as a disk characteristic for the disk 24 having the film thickness of 20 nm. In consideration of the above results, it is preferable for the C/N ratio of at least more than 54.0 dB, that the barrier layer be Ni having a thickness within the range of 1–20 nm.

EXAMPLE 3

This example shows recording and reproduction characteristics of the optical information recording media 13 according to the present invention, particularly the dependency of the C/N ratio on the film thickness of the first metal layer 2. More specifically, a plurality of samples of the optical information recording medium 13 in which the first metal layer 2 was a material of APC and had different film thicknesses were manufactured by the same method as in Example 1. Combinations of first metal layers and film thicknesses of the manufactured disk are shown in Table 4.

TABLE 4

| Disk No. | Film thickness of heat diffusion layer [nm] | C/N ratio | Decision |
|---|---|---|---|
| 25 | 10 | insufficient | insufficient |
| 26 | 20 | good | good |
| 27 | 50 | good | good |
| 28 | 100 | good | good |
| 29 | 200 | good | good |
| 30 | 300 | good | good |

The C/N ratios of the above samples were measured in the same manner as in Example 1. The obtained C/N ratios of the disks are also shown in Table 4. Note that the C/N ratio is distinguished to be good if it is 54 dB or more, and insufficient if it is less than 54 dB.

As shown in Table 4, the C/N ratio was 54.0 dB or more for the disks 26–29 in which the film thickness of the first metal layer 2 (APC) was within the range of 20–200 nm. Furthermore, for the disk having the film thickness of 300 nm, the C/N ratio was 54.0 dB or more. However, the C/N ratio is saturated, unlike when the thickness was 200 nm, which is not preferable from the viewpoint of productivity and cost of materials. In addition, the C/N ratio was less than 54.0 dB which is insufficient as a disk characteristic for the disk 25 having the film thickness of 10 nm.

In consideration of the above results, it is preferable for the C/N ratio of 54.0 dB or more, that the first metal layer be made of APC having a thickness within the range of 20–200 nm.

EXAMPLE 4

This example shows the dependency of the reflection factors of a crystalline portion and an amorphous portion (of the recording layer 8) on the film thickness of the metal layer 4 of the optical information recording medium 24. More specifically, samples of the medium 24 having the metal layer 4 made of a material of Al—Cu and different film thicknesses were manufactured by the same method as in Example 1. Then, the initialization step was performed for the obtained samples so that the recording layer 8 was crystallized, and reflection factors at the crystalline portion and the amorphous portion were measured. The measurement of the reflection factors was performed by using the recording and reproducing device 23 shown in FIG. 3. More specifically, the sample was rotated by the spindle motor 21, and the laser beam 12 at wavelength of 405 nm was irradiated and condensed on the sample to measure the reflection factor.

The measured results are shown in Table 5. Note that the result is distinguished to be good if the reflection factor is 18.0% or more at the crystalline portion and less than 2.0% at the amorphous portion, and insufficient if it is out of these ranges at either portion.

TABLE 5

| Sample No. | Film thickness of metal layer [nm] | Reflection factor at crystalline portion [%] | Reflection factor at amorphous portion [%] | Decision |
|---|---|---|---|---|
| 2-a | 10 | 15.4 | 4.5 | insufficient |
| 2-b | 20 | 18.4 | 1.9 | good |
| 2-c | 100 | 19.5 | 1.4 | good |
| 2-d | 200 | 19.6 | 1.3 | good |
| 2-e | 300 | 19.7 | 1.2 | good |
| 2-f | 400 | 19.7 | 1.2 | good |

It was found from the above results that the reflection factor is 18.0% or more at the crystalline portion and 2.0% or less at the amorphous portion which enables sufficient contrast for the samples 2-b, 2-c, 2-d, 2-e and 2-f having a film thickness of the reflection layer within the range 20–400 nm.

In addition, it was found that the reflection factor is less than 18.0% at the crystalline portion and 2.0% or more at the amorphous portion which means insufficient contrast for the sample 2-a having the film thickness of 10 nm. Furthermore, it was found that the reflection factor was saturated at the crystalline portion for the sample 2-f having the film thickness of 400 nm. Therefore, this sample is not preferable from the viewpoint of productivity and cost of materials.

In consideration of the above results, it is clear that a preferred film thickness of the metal layer 4 is within the range of 20–300 nm so that sufficient contrast and productivity can be obtained.

The optical information recording medium according to the present invention is an optical information recording medium on which information can be recorded and reproduced by using a laser beam, which is useful for improving reliability of film and recording characteristics related to the disk characteristics.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. An optical information recording medium for recording and reproducing information by using a laser beam, the recording medium comprising:
a substrate with a guide groove, on which at least a first metal layer, a barrier layer, a second metal layer and a recording layer are formed in this order, wherein
the second metal layer is primarily composed of a material whose main components are Al and a metal element as an additive, and
the metal element is a material containing at least one element selected from the group consisting of Cu, Ag, Au, B, Bi, Cd, Ga, Ge, Pb, Sn and Zn within the range of 0.1–15.0 atom %, and Ni, within the range of 0.1–10.0 atom %.

2. The optical information recording medium according to claim 1, wherein the metal element is a material containing at least one element selected from the group consisting of Cu, Ag, Au, B, Bi, Cd, Ga, Ge, Pb, Sn and Zn within the range of 0.1–10.0 atom %, and Ni, within the range of 0.1–7.5 atom %.

3. The optical information recording medium according to claim 1, wherein a film thickness of the second metal layer is within the range of 10–100 nm.

4. The optical information recording medium according to claim 1, wherein a film thickness of the second metal layer is within the range of 10–30 nm.

5. The optical information recording medium according to claim 1, wherein the barrier layer is a material containing at least one element selected from the group consisting of C, Si, Cr, Ni, Mo, W and Ta as a main component.

6. The optical information recording medium according to claim 1, wherein the barrier layer is a material containing a main component which is an oxide or nitride of at least one element selected from the group consisting of Al, Ti, Zr, Hf, Ta, Cr and Si.

7. The optical information recording medium according to claim 1, wherein a film thickness of the barrier layer is within the range of 1–20 nm.

8. The optical information recording medium according to claim 1, wherein the first metal layer is a material containing Ag as a main component.

9. The optical information recording medium according to claim 1, wherein a film thickness of the first metal layer is within the range of 20–300 nm.

10. The optical information recording medium according to claim 1, further comprising an upper dielectric layer between the second metal layer and the recording layer, and a lower dielectric layer on the far side of the recording layer from the upper dielectric layer.

11. The optical information recording medium according to claim 10, wherein the upper dielectric layer is a material containing S.

12. The optical information recording medium according to claim 10, wherein a main component of the first metal layer is Ag, a main component of the barrier layer is Ni, a main component of the second metal layer is Al, a main component of the upper dielectric layer is ZnS or an oxide, main components of the recording layer are Ge, Sb and Te, and a main component of the lower dielectric layer is ZnS or an oxide.

13. The optical information recording medium according to claim 10, wherein a film thickness of the first metal layer is within the range of 20–300 nm, a film thickness of the barrier layer is within the range of 1–20 nm, a film thickness of the second metal layer is within the range of 10–100 nm, a film thickness of the upper dielectric layer is within the range of 15–40 nm, a film thickness of the recording layer is within the range of 5–15 nm, and a film thickness of the lower dielectric layer is within the range of 30–100 nm.

14. The optical information recording medium according to claim 10, wherein a main component of the first metal layer is Ag, a main component of the barrier layer is Ni, a main component of the second metal layer is Al and includes Ni as an additive, a main component of the upper dielectric layer is ZnS or an oxide, main components of the recording layer are Ge, Sb and Te, and a main component of the lower dielectric layer is ZnS or an oxide.

15. The optical information recording medium according to claim 1, wherein the barrier layer is a material containing a main component which is Mo, or an oxide or nitride of at least one element selected from the group consisting of Al, Ti, Zr, Hf and Cr.

16. A method for manufacturing an optical information recording medium for recording and reproducing information by using a laser beam, the method comprising:

preparing a substrate with a guide groove, on which at least a first metal layer, a barrier layer, a second metal layer, an upper dielectric layer, a recording layer and a lower dielectric layer are formed in this order;

forming the second metal layer of a material containing main components that are Al and a metal element as an additive, wherein the metal element is a material containing at least one element selected from the group consisting of Cu, Ag, Au, B, Bi, Cd, Ga, Ge, Pb, Sn and Zn within the range of 0.1–15.0 atom %, and Ni, within the range of 0.1–10.0 atom %.

17. An optical information recording medium for recording and reproducing information by using a laser beam, the recording medium comprising:

a substrate with a guide groove, on which at least a metal layer and a recording layer are formed in this order, wherein the metal layer is a material containing main components that are Al and a metal element as an additive; and the metal element is a material containing at least one element selected from the group consisting of Cu, Ag, Au, B, Bi, Cd, Ga, Ge, Pb, Sn and Zn within the range of 1.0–15.0 atom %.

18. The optical information recording medium according to claim 17, wherein the metal element is a material containing at least one element selected from the group consisting of Cu, Ag, Au, B, Bi, Cd, Ga, Ge, Pb, Sn and Zn within the range of 1.0–10.0 atom %.

19. The optical information recording medium according to claim 17, wherein a film thickness of the metal layer is within the range of 20–300 nm.

20. The optical information recording medium according to claim 17, further comprising an upper dielectric layer disposed between the metal layer and the recording layer, and a lower dielectric layer disposed on the far side of the recording layer from the upper dielectric layer.

21. The optical information recording medium according to claim 20, wherein the upper dielectric layer is a material containing S.

22. The optical information recording medium according to claim 20, wherein a main component of the upper dielectric layer is ZnS or an oxide, main components of the recording layer are Ge, Sb and Te, or Ge, Bi and Te, and a main component of the lower dielectric layer is ZnS or an oxide.

23. The optical information recording medium according to claim 17, wherein a film thickness of the metal layer is within the range of 20–300 nm, a film thickness of the upper dielectric layer is within the range of 15–40 nm, a film thickness of the recording layer is within the range of 5–15 nm, and a film thickness of the lower dielectric layer is within the range of 30–100 nm.

24. A method for manufacturing an optical information recording medium for recording and reproducing information by using a laser beam, the method comprising:

preparing a substrate with a guide groove, on which at least a metal layer, an upper dielectric layer, a recording layer and a lower dielectric layer are formed in this order;

forming the metal layer of a material containing main components that are Al and a metal element as an additive, wherein the metal element is a material containing at least one element selected from the group consisting of Cu, Ag, Au, B, Bi, Cd, Ga, Ge, Pb, Sn and Zn within the range of 1.0–15.0 atom %.

25. An optical information recording medium for recording and reproducing information by using a laser beam, the recording medium comprising:

a substrate with a guide groove, on which at least a first metal layer, a barrier layer, a second metal layer and a recording layer are formed in this order, wherein:

the second metal layer is primarily composed of a material whose main components are Al and a metal element as an additive, and the metal element is a material containing at least one element selected from the group consisting of Cu, Ag, Au, B, Bi, Cd, Ga, Ge, Pb, Sn and Zn within the range of 0.1–15.0 atom %, Ni, Si and Pt within the range of 0.1–10.0 atom %, and Ta, Cr and Ti within the range of 0.1–7.5 atom %; and the barrier layer is a material containing a main component which is at least Mo, or an oxide or nitride of at least one element selected from the group consisting of Al, Ti, Zr, Hf, and Cr.

26. The optical information recording medium according to claim 25, wherein the first metal layer is a material containing Ag as a main component.

* * * * *